(12) United States Patent
Russell et al.

(10) Patent No.: US 11,134,747 B2
(45) Date of Patent: Oct. 5, 2021

(54) SHOE OR APPAREL WITH ADDITIVE MANUFACTURED ELEMENT

(71) Applicant: adidas AG, Herzogenaurach (DE)

(72) Inventors: Stephen John Russell, Nuremberg (DE); Jessica Dorothy Janine Hymas, Nuremberg (DE)

(73) Assignee: adidas AG, Herzogenaurach (DE)

( * ) Notice: Subject to any disclaimer, the term of this patent is extended or adjusted under 35 U.S.C. 154(b) by 62 days.

(21) Appl. No.: 16/283,086

(22) Filed: Feb. 22, 2019

(65) Prior Publication Data

US 2019/0313732 A1    Oct. 17, 2019

(30) Foreign Application Priority Data

Apr. 11, 2018 (DE) .................. 10 2018 205 457.6

(51) Int. Cl.
| | |
|---|---|
| *B32B 3/24* | (2006.01) |
| *A43B 13/12* | (2006.01) |
| *A43B 13/04* | (2006.01) |
| *A43B 13/14* | (2006.01) |
| *A43B 23/02* | (2006.01) |
| *B33Y 10/00* | (2015.01) |
| *B33Y 80/00* | (2015.01) |

(Continued)

(52) U.S. Cl.
CPC .............. *A43B 13/12* (2013.01); *A43B 13/04* (2013.01); *A43B 13/141* (2013.01); *A43B 23/0215* (2013.01); *A43B 23/0235* (2013.01); *A41D 13/065* (2013.01); *A41D 13/08* (2013.01); *A43B 5/00* (2013.01); *B32B 3/266* (2013.01); *B33Y 10/00* (2014.12); *B33Y 80/00* (2014.12); *Y10T 428/24347* (2015.01)

(58) Field of Classification Search
CPC .................. Y10T 428/24347; A43B 13/141
See application file for complete search history.

(56) References Cited

U.S. PATENT DOCUMENTS

| | | |
|---|---|---|
| 2,495,984 A | 1/1950 | Roy |
| 5,581,805 A | 12/1996 | Rennick |

(Continued)

FOREIGN PATENT DOCUMENTS

| | | |
|---|---|---|
| CA | 2341088 A1 | 9/2002 |
| DE | 60122007 T2 | 3/2007 |

(Continued)

OTHER PUBLICATIONS

Extended European Search Report and Written Opinion for European Application No. 19157265.0 dated Aug. 30, 2019 (8 pages).

*Primary Examiner* — William P Watkins, III
(74) *Attorney, Agent, or Firm* — Sterne, Kessler, Goldstein & Fox P.L.L.C.

(57) ABSTRACT

A shoe or apparel, including a first material layer with a first plurality of protrusions, a flexible layer with a plurality of apertures, and a second material layer. The flexible layer is positioned between the first material layer and the second material layer. Each protrusion of the first plurality of protrusions of the first material layer extends through at least one aperture of the plurality of apertures of the flexible layer and is connected to the second material layer. The flexible layer is not connected to the first material layer and the second material layer, and thereby can freely move between the first material layer and the second material layer.

20 Claims, 8 Drawing Sheets

(51) Int. Cl.
  *A41D 13/06* (2006.01)
  *A41D 13/08* (2006.01)
  *A43B 5/00* (2006.01)
  *B32B 3/26* (2006.01)

(56) References Cited

U.S. PATENT DOCUMENTS

| | | |
|---|---|---|
| 7,047,668 B2 | 5/2006 | Burris et al. |
| 9,005,710 B2 | 4/2015 | Jones et al. |
| 2013/0212908 A1 | 8/2013 | Hsu |
| 2013/0232815 A1* | 9/2013 | Meythaler .............. A43B 5/025 36/45 |
| 2016/0168756 A1 | 6/2016 | Gladish et al. |
| 2017/0071289 A1 | 3/2017 | Auyang et al. |

FOREIGN PATENT DOCUMENTS

| | | |
|---|---|---|
| DE | 102014116624 A1 | 5/2016 |
| DE | 202017101310 U1 | 5/2017 |
| EP | 2630885 A1 | 8/2013 |
| WO | WO 2011/051984 A1 | 5/2011 |
| WO | WO 2011/080779 A1 | 7/2011 |
| WO | WO 2012/006747 A1 | 1/2012 |

* cited by examiner

SHOE OR APPAREL WITH ADDITIVE MANUFACTURED ELEMENT

TECHNICAL FIELD

The present invention relates generally to a shoe or an apparel, to a method for manufacturing a shoe or an apparel and to an apparatus suitable for the manufacturing of a shoe or an apparel.

PRIOR ART

Shoes and apparel, in particular sports shoes and sports apparel, are often manufactured from a plethora of different materials that meet highly diverse functional requirements, depending on the specific type of shoe or apparel and the respective application.

For example, a sports shoe usually comprises an upper and a sole. The upper may be formed of various materials, such as warp- or weft-knitted fabrics, wovens, natural or synthetic leather, or rubber, which shall provide for sufficient flexibility, breathability, waterproofness, and/or stabilization of the foot. The sole usually comprises a midsole and an outsole, for example from a thermoplastic material such as polyurethane or thermoplastic rubber, and may be secured to the upper by means of stitching, bonding, and/or mold injection.

Sports apparel, in particular protective gear, such as shin guards, arm protectors, back protectors, knee pads for knee protection, protective headwear, or gloves, may also be provided from different materials, such as stretchable textile materials that adapt to the wearer's anatomy and thus provide a comfortable fit, and stiff materials that protect parts of the wearer's body, such as the elbow, the knee, the back, the head or the hand.

For example, U.S. Pat. No. 9,005,710 relates to a method of three-dimensional printing and assembly of an article of apparel, footwear, or equipment. Specifically, the method relates to an article of footwear having an upper that includes 3D printing directly onto at least a first portion of an upper material and a sole formed by 3D printing onto at least a second portion of the upper material.

U.S. Pat. No. 7,047,668 relates to an article of footwear with an upper having a substrate layer and a polymer layer. The polymer layer is formed of a polymer material that infiltrates the substrate layer and is thereby secured to the substrate layer.

US 2016/0168756 relates to compositions of nonwoven, fibrous films or membranes based on superfine fibers for use in construction of articles. In particular, layers may be used to form a composite structure, and the layers may the bound together by (fusion) bonding, ultrasonic welding, chemical bonding, and stitching.

EP 2 630 885 relates to a material for a shoe upper comprising an inner polyurethane layer, an outer polyurethane layer, and a textile reinforcing layer arranged between the inner polyurethane layer and the outer polyurethane layer. The textile reinforcing layer comprises apertures through which the inner polyurethane layer and the outer polyurethane layer are connected to each other.

However, the combinations of textile materials and thermoplastic materials known from the prior art may have the disadvantage that the functional properties of the textile material are lost when it is infiltrated with or glued to the thermoplastic material. For example, in case thermoplastic material is injection-molded, the textile material, which serves as a substrate for the molding process, may suffer from thermic stress. Additional laborious and cost-inefficient stitching and/or gluing steps may be required to secure the thermoplastic material to the textile material. Moreover, after injection-molding, gluing or stitching, the textile material cannot freely move or even stretch in the processed regions and eventually loses important functions, such as breathability and flexibility.

It is therefore an object of the present invention to provide a shoe or apparel which removes or at least reduces the described disadvantages of the prior art. It is a further object to provide a method for the manufacturing of a corresponding shoe or apparel, and to provide an apparatus for the manufacturing.

SUMMARY OF THE INVENTION

According to a first aspect of the present invention, this problem is at least partially solved by a shoe or apparel, comprising a first material layer with a first plurality of protrusions, a flexible layer with a plurality of apertures, and a second material layer, wherein the flexible layer is positioned between the first material layer and the second material layer, and wherein each protrusion of the first plurality of protrusions of the first material layer extends through at least one aperture of the plurality of apertures of the flexible layer and is connected to the second material layer.

By providing the first material layer with protrusions that extend through the apertures of the flexible layer, the flexible layer is not influenced by the connection to the second material layer. In particular, further functional properties of the flexible material, such as breathability and/or stretchability are maintained. Thus, the flexible layer can provide for sufficient ventilation and can adjust to the shape of the foot or the body of the person wearing the shoe or apparel over the whole surface the flexible layer is covering.

Moreover, by connecting the protrusions of the first material layer to the second material layer while sandwiching the flexible layer, the flexible layer is secured between the first material layer and the second material layer via the protrusions in a highly durable and resistant manner.

The flexible layer is not connected to the first material layer and the second material layer, and thereby can freely move between the first material layer and the second material layer. Thus, the flexible layer is restricted in its movement only by the protrusions extending through the apertures of the textile layer.

The flexible layer may freely move in a direction parallel to the first and the second material layer, wherein the movement is substantially limited to a distance determined by a plurality of gaps, each gap being formed between each protrusion and each aperture, through which the protrusion extends.

Furthermore, the flexible layer may freely move in a direction perpendicular to the first and second material layer, wherein the movement is limited to a distance determined by the plurality of protrusions of the first material layer or the distance between the first and second material layer.

Such a construction of the flexible layer being not connected to the material layers has the advantage that the flexible layer maintains its full flexibility. This can be of importance for sports shoes or sports apparel that are provided from functional textiles and that adapt to the wearer's foot or body to provide a comfortable fit.

The first material layer and the second material layer may not infiltrate the flexible layer outside the plurality of apertures. The apertures may each comprise a cross-sectional area ranging from 9 mm² to 100 mm².

At least one protrusion may have a cross-sectional area, which is at least 20% smaller, preferably at least 40% smaller, more preferably at least 60% smaller, and most preferably at least 80% smaller than the cross-sectional area of the aperture, through which the at least one protrusion extends. Thereby, the flexible layer maintains a high degree of movability and can well adapt to the movements of the wearer's body parts, for example the foot or the arm.

The flexible layer may freely stretch between the first material layer and the second material layer. Thus, the natural stretch of the flexible layer can be maintained at least to some extent, despite the first and second material layer being arranged on both sides of the flexible layer.

The protrusions of the first plurality of protrusions of the first material layer may each have a length ranging from 1 mm to 10 mm.

By providing protrusions with lengths in a range of 1 to 10 mm, the distance to the second material layer may be varied across the area of connection. Said distance between the first and the second material layer can, therefore, provide for an anatomic fit of the two material layers to the foot or the body of the person wearing the shoe or apparel.

The protrusions may each comprise a cross-sectional area ranging from 4 mm² to 80 mm². By varying the areas of the protrusions of the first material layer, the strength of the connection to the second material layer can be varied across the area of connection. In particular, those regions that usually encounter high loads during wearing, e.g. regions of the sole during running, may be reinforced by providing connecting protrusions of increased cross-sectional area.

The protrusions of the first plurality of protrusions of the first material layer may be arranged to yield densities ranging from 0.5 to 5 protrusions per cm².

In particular those areas of the first and second material layer, which usually encounter high loads during wearing, can be reinforced by means of a higher density of protrusions.

The protrusions may also have varying shapes, such as cylinders and/or cuboids. The protrusions may be hollow or solid.

The first material layer and/or the second material layer may have a three-dimensional shape.

The three-dimensional shape is to be understood independent from the plurality of protrusions. For example, the first material layer or the second material layer may be formed as a midsole and may be three-dimensionally shaped to support the arch region of the foot, which is a particularly sensitive region of the foot. The three-dimensional shape, thus, supports the wear comfort and prevents fatigue and injuries.

The three-dimensional shaped first material layer and/or the second material layer may each have a thickness ranging from 1 mm to 30 mm along a lateral axis and/or a longitudinal axis of the first material layer and/or second material layer.

The thickness of the respective material layers can influence the mechanical properties of the material layers, in particular their flexibilities. By locally varying the thickness, regions that require a certain stiffness may be provided with a thicker material layer. Other regions, which require a certain flexibility to provide for a comfortable fit to the wearer, may be provided with a thinner material layer.

The flexible layer may have dimensions which extend beyond the first and/or second material layer. The dimensions of the first and the second material layer may also differ.

The flexible layer, the first material layer and the second material layer may, thus, provide different regions of a shoe or an apparel. The flexible layer may, for example, provide at least partially a shoe upper, while the first material layer provides at least partially a shoe midsole and the second material layer provides at least partially a shoe outsole. In another example, the flexible layer may provide at least partially a sports top, while the first and the second material layers provide at least partially reinforcement regions, e.g. for the elbow or the back.

The flexible layer may comprise a textile material, natural leather, synthetic leather, and/or rubber. The flexible layer may consist of a textile material, natural leather, synthetic leather, or rubber.

The textile material of the flexible layer may comprise elastic yarns. The elastic yarn may, preferably, comprise elastane or rubber.

By providing the flexible layer with elastic yarns, the flexible layer can adjust to the wearer's anatomy and increase the wearing comfort. For example, when the flexible layer is a portion of a shoe upper, the wearing comfort of the shoe as a whole is increased.

The textile material of the flexible layer may be formed from natural and/or synthetic yarns. The textile is preferably breathable, and can be impermeable to water or dirt.

The textile material of the flexible layer may be knitted or woven.

In particular, the textile material of the flexible layer may be weft-knitted. Weft-knitting has the advantage that the flexible layer can be relatively easily provided with specific structures, such as the plurality of apertures. For example, a weft-knitted textile can be provided with various weft-knitted patterns in various areas on the textile. The textile material may be flat weft-knitted. In flat weft-knitting, a certain yarn, such as an elastic yarn, can be used in certain areas of the weft-knitted textile material.

Alternatively, the textile material of the flexible layer is warp-knitted. Textiles may be cost-effectively and quickly manufactured on a warp-knitting machine.

The textile material of the flexible layer may be also woven. Woven textiles are easy to produce, and have durable properties.

It is possible that the textile material of the flexible layer comprises a melting yarn. A melting yarn may be fused by heating. The melting yarn hardens when it is subsequently cooled down. This may be, for example, important when the flexible layer is a portion of a shoe upper. By means of melting yarns, the textile material of the flexible layer may be specifically stiffened, in particular outside the region where the flexible layer is sandwiched between the first and second material layers. Higher stability by regionally stiffening the flexible layer may be especially important in the heel area, the toe area, and the lateral midfoot area.

The plurality of apertures in the flexible layer may be provided during the manufacturing process, e.g. during knitting or weaving.

Alternatively or in addition, the flexible layer may be laser-cut to provide the plurality of apertures. Laser cutting the flexible layer, e.g. comprising natural or synthetic yarns, natural or synthetic leather, has the advantage that the apertures can be provided with shapes and/or dimensions which would not be possible by a knitting or weaving process. Furthermore, the apertures can be fabricated with a high precision and in a cost-efficient automatic manner. In particular where the flexible layer comprises synthetic yarns or leather, laser cutting results in a small seal, which inhibits frazzling at the boundaries.

The first material layer and/or the second material layer may comprise at least one thermoplastic material.

Thermoplastic materials are easy to process and allow the manufacture of a variety of complex structures. In particular, thermoplastic materials are robust, durable, and lightweight, and therefore well suited to applications in shoes and/or apparel.

The first and second material layers may comprise the same thermoplastic material. Preferably, the first and the second material layers may each comprise at least one thermoplastic material with a similar or the same melting temperature.

In particular, the first material layer and/or the second material layer may comprise thermoplastic rubber (TPR), polyurethane (PU), elastomeric polyurethane (EPU), polylactic acid (PLA), and/or ethylene vinyl acetate (EVA).

The first material layer and/or the second material layer may comprise a metal material. For example, an aluminum alloy, such as AlSi10Mg, 239, or a metal material comprising Ti6Al4V might be used. In general, materials used may include metals such as aluminum, titanium, steel (e.g., maraging steel, stainless steel) or the like, alloys such as aluminum alloys (e.g., AlSiMg), titanium alloys (e.g., Ti64, Ti6Al4V), cobalt chrome alloys (e.g., CC MP1), nickel alloys (e.g., IN718, NiCr19Fe19NbMo3), super-alloys, composites, thermoplastics, thermosets, and/or combinations thereof.

In the context of the present invention, materials like ceramic, polymers, a printed composite and a combination of two or more materials may be used as well.

The first material layer and/or the second material layer may be integrally provided as a single piece.

By integrally manufacturing the first material layer and/or the second material layer as a single piece, very durable materials can be provided. In particular, by manufacturing the first material layer and the second material layer as a single piece, no further bonding agents are required to connect the plurality of protrusions of the first material layer to the second material layer. Furthermore, by providing the first and the second material layer as a single piece, both layers are able to interact in an optimum manner, and exerted forces can be directly transmitted between the two material layers. Moreover, the manufacture of the two material layers as a single piece is easy and cost-effective, since there is no need for separate manufacturing, aligning the two material layers and connecting them, for example by gluing.

It is also possible for the first and the second material layers being provided as a single piece that the first material layer and/or the second material layer is not a continuous layer. In particular, the first material layer and/or the second material layer may be provided as a plurality of reinforcing areas that are connected by the plurality of protrusions, as described further below.

The first material layer and the second material layer may be manufactured in a single additive manufacturing process.

The use of an additive manufacturing process allows customization of the first and second material layers to the individual anatomy of the foot or the body of a future wearer. Integrally manufacturing the first and the second material layers as a single piece does not exclude that other portions of e.g. a shoe or apparel may be created using other manufacturing processes including other 3D manufacturing processes.

Suitable additive manufacturing processes include stereolithography (SLA), selective laser sintering (SLS), fused deposition modeling (FDM), multi jet modeling (MJM), 3-dimensional printing (3DP) or continuous liquid interface production (CLIP), which may be in particular applied for the processing of thermoplastic materials. It is further possible that the additive manufacturing process comprises laser sintering of the above-mentioned metal materials.

The second material layer may also comprise a second plurality of protrusions.

The protrusions of the second plurality of protrusions may have lengths ranging from 1 to 10 mm, and/or densities ranging from 0.5 to 5 protrusions per $cm^2$, and/or cross-sectional areas ranging from 4 to 80 $mm^2$.

The effects described above in relation to the first material layer also apply to the second material layer.

At least one protrusion of the second plurality of protrusions of the second material layer may extend through at least one aperture of the plurality of apertures of the flexible layer and may be connected to the first material layer.

In this regard, protrusions of the first material layer may be connected to protrusions of the second material layer. It is also possible, that the protrusions of the second material layer connect to the first material layer outside the first plurality of protrusions.

By providing both the first material layer and the second material layer with protrusions, the points where the two layers connect may be flexibly chosen. Moreover, the distance between the first and the second material layers and the strength of connection may vary along the connecting portions.

The second plurality of protrusions may extend in the direction opposite to the first material layer and the flexible layer. In this regard, at least one protrusion of the second plurality of protrusions may extend through at least one aperture of a second plurality of apertures of a second flexible layer and may be connected a third material layer.

The second flexible layer may have the same properties as the flexible layer that is positioned between the first material layer and the second material layer. The third material layer may have the same properties as the first material layer and/or the second material layer.

By providing a further structure comprising a second flexible layer and a third material layer, the overall structure can be extended to multiple functional layers. The layers may meet different functionalities, such as waterproofness, breathability, and so forth.

The first material layer and/or the second material layer may comprise a network of reinforcing struts.

By providing reinforcing struts, the first and/or second material layer can be provided as a very light layer. In particular, when the network of reinforcing struts is provided as a single piece, manufactured in an additive manufacturing process, both low weight and durability can be achieved.

The reinforcing struts may be interconnected by a plurality of nodes. The nodes may interconnect multiple reinforcing struts. In particular, the nodes may comprise an X-shaped cross-sectional form.

Nodes can distribute forces acting on the network of reinforcing struts in a largely isotropic manner and thus lead to a stabilization of the network with regard to any forces acting in a direction within the plane in which the cross-section is taken.

The first material layer and/or the second material layer may comprise a pattern of reinforcing areas.

In particular, the reinforcing areas may be geometrically arranged, such as in the form of hexagons, squares or circles.

Each reinforcing area may be connected to at least one protrusion of the first and/or the second material layer. Each reinforcing area may comprise a surface area which is larger than the cross-sectional area of the aperture that the at least one protrusion connected to the reinforcing area is extending through.

The reinforcing areas may each comprise a surface area ranging from 9 to 225 mm$^2$. In particular, the size of the reinforcing areas may be adapted to the wearer's anatomy. The reinforcing areas may be, for example, of smaller diameter in regions that require a high flexibility.

The reinforcing areas of the first or second material layers may be provided as individual areas that are not connected with each other. By providing reinforcing areas that are not connected with each other within one material layer, an even higher flexibility of the shoe or apparel can be obtained. In particular, both the first and the second material layers may comprise a pattern of reinforcing areas, each reinforcing area being only connected to at least one protrusion of the first and/or second material layers.

Alternatively, the first material layer may comprise a pattern of reinforcing areas or reinforcing struts, and the reinforcing areas or struts may be provided as individual areas or struts that are only connected with each other by the protrusions connecting the first and second material layers. In this embodiment, the second material layer may, for example, comprise a network of interconnected reinforcing struts.

The present invention also relates to a shoe, in particular a sports shoe, comprising an upper and a sole, wherein the flexible layer forms a portion of the upper.

The first material layer and/or the second material layer may form a shoe sole, in particular a shoe midsole, a shoe insole or a shoe outsole.

The first material layer may form the shoe outsole or insole and the second material layer may form the shoe midsole.

The first material layer and/or the second material layer may form at least one reinforcing element of the shoe upper.

The reinforcing element of the first material layer or second material layer may be at least one of a toe cap, lateral side wing, medial side wing, and/or a heel cap.

The shoe may further comprise a releasable insole.

The present invention also relates to apparel, in particular sports apparel, wherein the first material layer and/or the second material layer forms at least one reinforcing element of the apparel. The first material layer and/or the second material layer may enhance the anti-abrasion properties of the apparel.

The apparel may be an outer-layer apparel, in particular a protective garment, such as a shin guard, an arm protector, a knee pad for protection of the knee or knee protector, protective headwear, a back protector, and/or a glove.

The present invention also relates to a method of manufacturing a shoe or apparel, comprising the steps of:
 a. manufacturing a first material layer with a first plurality of protrusions;
 b. manufacturing a flexible layer with a plurality of apertures;
 c. positioning the flexible layer onto the first material layer, such that each protrusion of the first plurality of protrusions of the first material layer extends through at least one aperture of the plurality of apertures of the flexible layer;
 d. manufacturing a second material layer;
 e. connecting each protrusion of the first plurality of protrusions of the first material layer to the second material layer.

In the following, further advantageous embodiments for the method of manufacturing a shoe or apparel are described. The specific effects of these embodiments, that are explained above in the context of the manufactured shoe or apparel, also apply to the embodiments of the method according to the invention.

During manufacturing, the first material layer and the second material layer may not infiltrate the flexible layer outside the plurality of apertures.

The flexible layer may be manufactured to comprise apertures with a cross-sectional area ranging from 9 mm$^2$ to 100 mm$^2$.

During manufacturing, the flexible layer may not be connected to the first material layer and the second material layer, and thereby can freely move between the first material layer and the second material layer.

At least one protrusion may be manufactured to have a cross-sectional area, which is at least 20% smaller, preferably at least 40% smaller, more preferably at least 60% smaller, most preferably at least 80% smaller than the cross-sectional area of the aperture, through which the at least one protrusion extends.

The flexible layer may freely stretch between the first material layer and the second material layer.

The protrusions of the first plurality of protrusions of the first material layer may each be manufactured to comprise a length ranging from 1 mm to 10 mm.

The protrusions may each be manufactured to comprise a cross-sectional area ranging from 4 mm$^2$ to 80 mm$^2$.

The protrusions of the first plurality of protrusions of the first material layer may be manufactured to yield densities ranging from 0.5 to 5 protrusions per cm$^2$.

The protrusions may be manufactured in varying shapes, such as cylinders and/or cuboids.

The first material layer and/or the second material layer may be manufactured to comprise a three-dimensional shape. Again, the three-dimensional shape is to be understood independent from the plurality of protrusions.

The three-dimensional shaped first material layer and/or the second material layer may be manufactured to have a thickness ranging from 1 mm to 30 mm along a lateral axis and/or a longitudinal axis of the first material layer and/or second material layer.

The flexible layer may be manufactured to have dimensions which extend beyond the first and/or second material layers. The dimensions of the first and the second material layers may also differ.

The flexible layer may comprise a textile material, natural leather, synthetic leather, and/or rubber. The flexible layer may consist of a textile material, natural leather, synthetic leather, or rubber.

An elastic yarn may be used to manufacture the textile material of the flexible layer. The elastic yarn may, preferably, comprise elastane or rubber.

Natural and/or synthetic yarns may be used to manufacture the textile material of the flexible layer. The textile is preferably breathable, and can be impermeable to water or dirt.

The textile material of the flexible layer may be knitted or woven.

Alternatively, the textile material of the flexible layer may be warp-knitted.

The textile material of the flexible layer may be also woven.

A melting yarn may be used to manufacture the textile material of the flexible layer.

The plurality of apertures in the flexible layer may be provided during the manufacturing process, e.g. during knitting or weaving.

Alternatively or in addition, the flexible layer may be laser-cut to provide the plurality of apertures.

The first material layer and/or the second material layer may be manufactured from at least one thermoplastic material.

The first and second material layers may be manufactured from the same thermoplastic material. Preferably, the first and the second material layers may be manufactured from at least one thermoplastic material with a similar or the same melting temperature.

In particular, the first material layer and/or the second material layer may be manufactured from thermoplastic rubber (TPR), polyurethane (PU), elastomeric polyurethane (EPU), polylactic acid (PLA), and/or ethylene vinyl acetate (EVA).

The first material layer and/or the second material layer may be manufactured to comprise a metal material. For example, an aluminum alloy, such as AlSi10Mg, 239, or a metal material comprising Ti6Al4V might be used. In general, materials used may include metals such as aluminum, titanium, steel (e.g., maraging steel, stainless steel) or the like, alloys such as aluminum alloys (e.g., AlSiMg), titanium alloys (e.g., Ti64, Ti6Al4V), cobalt chrome alloys (e.g., CC MP1), nickel alloys (e.g., IN718, NiCr19Fe19NbMo3), super-alloys, composites, thermoplastics, thermosets, and/or combinations thereof. Materials like ceramic, polymers, a printed composite and a combination of two or more materials may be used as well.

The first material layer and/or the second material layer may be manufactured as a single piece.

It is also possible for the first and the second material layers being provided as a single piece that the first or the second material layer is manufactured as a continuous layer. In particular, the first and/or the second material layers may be provided as a plurality of reinforcing areas, as described further below.

The first material layer and the second material layer may be manufactured in a single additive manufacturing process.

In particular, at least step e) may comprise an additive manufacturing process step, preferably steps a), d) and e) may comprise an additive manufacturing process step.

Suitable additive manufacturing processes include stereolithography (SLA), selective laser sintering (SLS), fused deposition modeling (FDM), multi jet modeling (MJM), 3-dimensional printing (3DP) or continuous liquid interface production (CLIP), which may be in particular applied for the processing of thermoplastic materials. It is further possible that the additive manufacturing process comprises laser sintering of the above-mentioned metal materials.

The second material layer may also be manufactured to comprise a second plurality of protrusions.

The protrusions of the second plurality of protrusions may be manufactured to comprise lengths ranging from 1 to 10 mm, and/or densities ranging from 0.5 to 5 protrusions per $cm^2$, and/or cross-sectional areas ranging from 4 to 80 $mm^2$.

At least one protrusion of the second plurality of protrusions of the second material layer may be manufactured to extend through at least one aperture of the plurality of apertures of the flexible layer and may be connected to the first material layer.

Protrusions of the first material layer may be connected to protrusions of the second material layer. It is also possible, that the protrusions of the second material layer connect to the first material layer outside the first plurality of protrusions.

The second plurality of protrusions may be manufactured to extend in the direction opposite to the first material layer and the flexible layer. In this regard, at least one protrusion of the second plurality of protrusions may extend through at least one aperture of a second plurality of apertures of a second flexible layer and may be connected a third material layer.

The second flexible layer may have the same properties as the flexible layer that is positioned between the first material layer and the second material layer. The third material layer may have the same properties as the first material layer and/or the second material layer.

The first material layer and/or the second material layer may be manufactured to comprise a network of reinforcing struts.

The reinforcing struts may be interconnected by a plurality of nodes. The nodes may interconnect multiple reinforcing struts.

The first material layer and/or the second material layer may be manufactured to comprise a pattern of reinforcing areas.

In particular, the reinforcing areas may be geometrically arranged, such as in the form of hexagons, squares or circles.

Each reinforcing area may be connected to at least one protrusion of the first and/or the second material layers. Each reinforcing area may comprise a surface area which is larger than the cross-sectional area of the aperture that the at least one protrusion connected to the reinforcing area is extending through.

The reinforcing areas may each be manufactured to comprise a surface area ranging from 9 to 225 $mm^2$.

The reinforcing areas may be provided as individual areas that are not connected with each other.

Alternatively, the first material layer may comprise a pattern of reinforcing areas or reinforcing struts, and the reinforcing areas or struts may be provided as individual areas or struts that are only connected with each other by the protrusions connecting the first and second material layers. In this embodiment, the second material layer may, for example, comprise a network of interconnected reinforcing struts.

According to the method, a shoe may be manufactured, comprising an upper and a sole, wherein the flexible layer forms a portion of the upper.

The first material layer and/or the second material layers may be manufactured to form a shoe sole, in particular a shoe midsole, a shoe insole or a shoe outsole.

The first material layer may be manufactured to form the shoe outsole or insole and the second material layer may form the shoe midsole.

The first material layer and/or the second material layers may be manufactured to form at least one reinforcing element of the shoe upper.

The reinforcing element of the first material layer or second material layer may be manufactured to comprise at least one of a toe cap, lateral side wing, medial side wing, and/or a heel cap.

"Layer" in the context of the present invention, such as material layer, refers to a structure comprising a substantially planar surface, which is arranged substantially parallel to another substantially planar surface. The planar surface of the layer does not need to be formed as a continuous surface, but may, for example, consist of a plurality of smaller elements, such as struts or areas, that are not connected to each other within the planar surface. Instead, those smaller elements may be connected to each other outside of the planar surface. For example, the smaller elements may be connected to each other via connected protrusions extending from the smaller elements.

BRIEF DESCRIPTION OF THE FIGURES

Aspects of the present invention will be explained in more detail with reference to the accompanying figures in the following. These figures show.

DETAILED DESCRIPTION OF CURRENTLY PREFERRED EMBODIMENTS

In the following, embodiments and variations of the present invention are described in more detail by means of a shoe and apparel, in particular a sports shoe and sports apparel. It is, however, emphasized that the present invention is not limited to this.

It is also mentioned that in the following only individual embodiments of the invention can be described in more detail. The skilled person will realize, however, that the features and design options described in relation to these specific embodiments may also be modified or combined in a different manner within the scope of the invention, and that individual features may also be omitted if these seem dispensable in a given case.

The use of a multilayered composition, comprising a first material layer with a plurality of protrusions, a flexible layer with a plurality of apertures and a second layer, allows to equip a shoe or apparel with different materials that are stably connected. Importantly, the connection of the different materials does not influence their individual properties.

The flexible layer, which may form, for example a shoe upper or a sports top, may be equipped with different functional properties, such as bendability, stretchability, permeability to air and water, thermoconductivity, thermal capacity, moisture absorption, abrasion resistance, hardness and thickness.

Figure 1A:
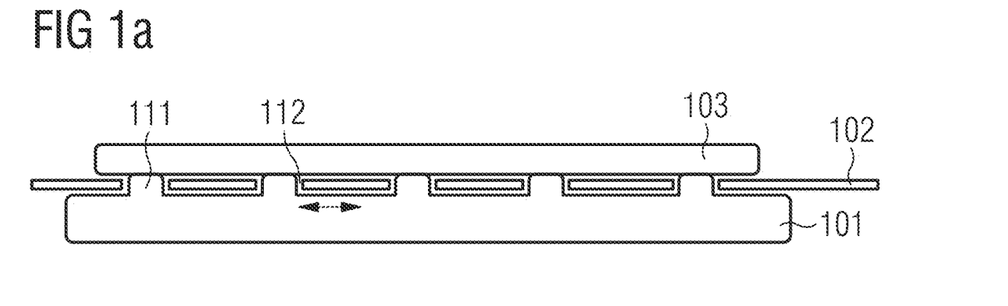
FIGS. 1a, b: schematic representations of structures comprising a first material layer with protrusions, a flexible layer with apertures, and a second material layer according to the present invention.

FIG. 1a shows a schematic representation of a structure according to the present invention. A first material layer 101 comprises a plurality of protrusions 111. The protrusions 111 extend through the apertures 112 of the flexible layer 102 and are connected to the second material layer 103. The apertures of the flexible layer are slightly larger than the protrusions of the first layer, such that a small gap is formed between the apertures and the protrusions. Thereby, the flexible layer is not connected to the first and second material layer and can freely move in a planar direction within a distance that is determined by the gap between each protrusion and the corresponding aperture (indicated by the dotted bidirectional arrow).

Figure 1B:
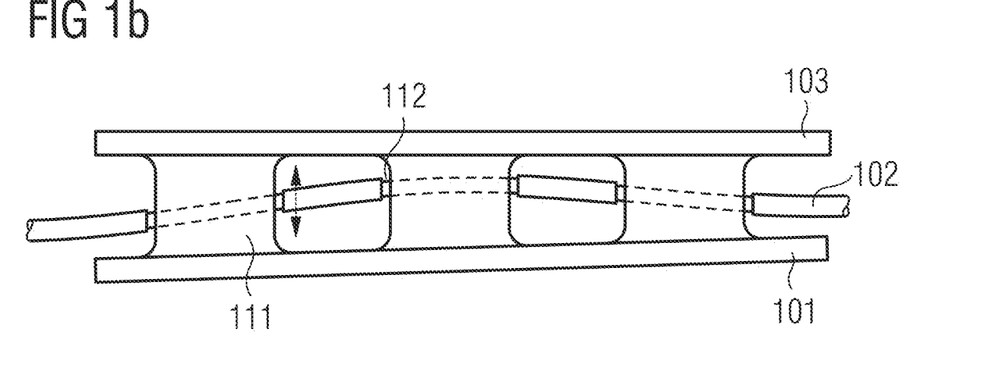

FIG. 1b shows a related schematic representation, wherein regular-sized protrusions 111 of the first material layer 101 extend through the apertures of the flexible layer 102. The protrusions can be chosen with a length that is significantly larger than the thickness of the flexible layer. Thereby, the flexible layer can also freely move within a distance that is determined by the length of the protrusions (indicated by the dotted bidirectional arrow).

Figure 1C:
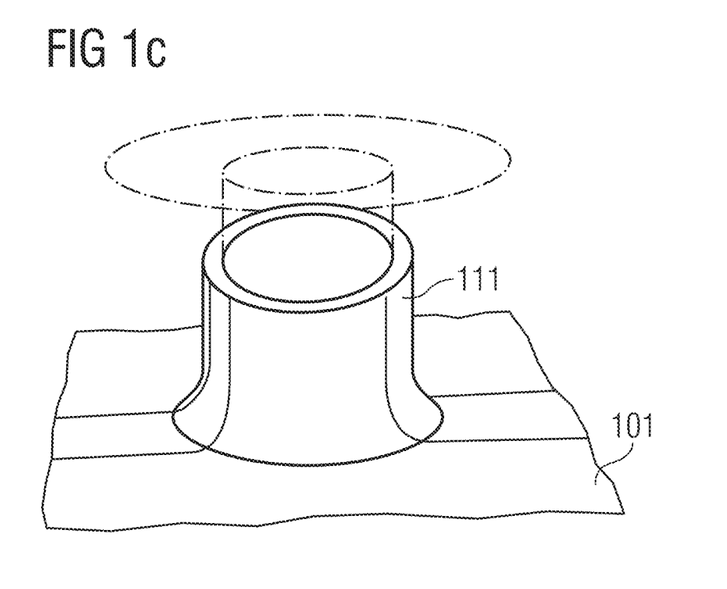
FIGS. 1c, d: schematic representations of protrusions according to the present invention.

The protrusions can be formed in various shapes. For example, the protrusions 111 of the first material layer 101 can be formed in a cylindrical shape, as schematically represented in FIG. 1c. Hollow structures, e.g. hollow cylinders are conceivable, as depicted in FIG. 1c. In principle, the protrusions can also be formed in solid structures, such as solid cylinders (not shown).

Figure 1D:
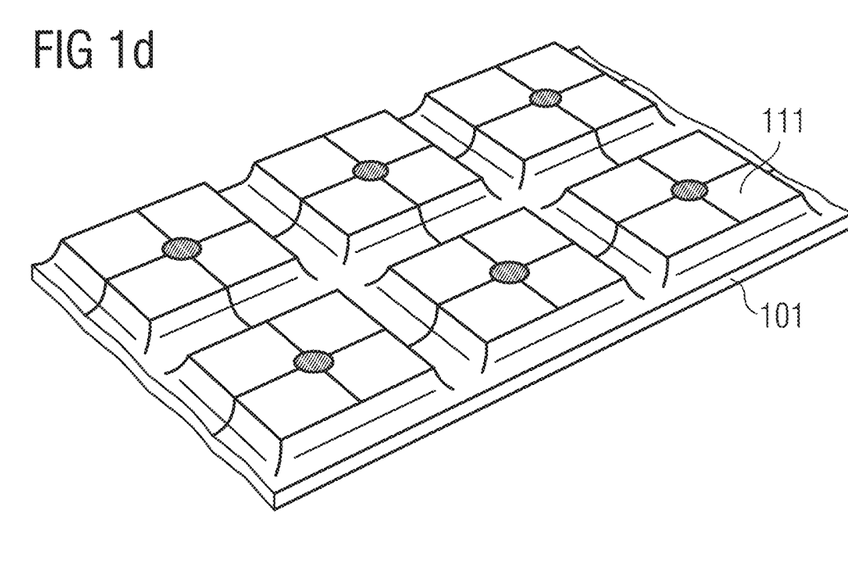

The protrusions 111 of the first material layer 101 can be also formed as solid or hollow cuboids, for example, as shown in FIG. 1d.

Figure 2A:
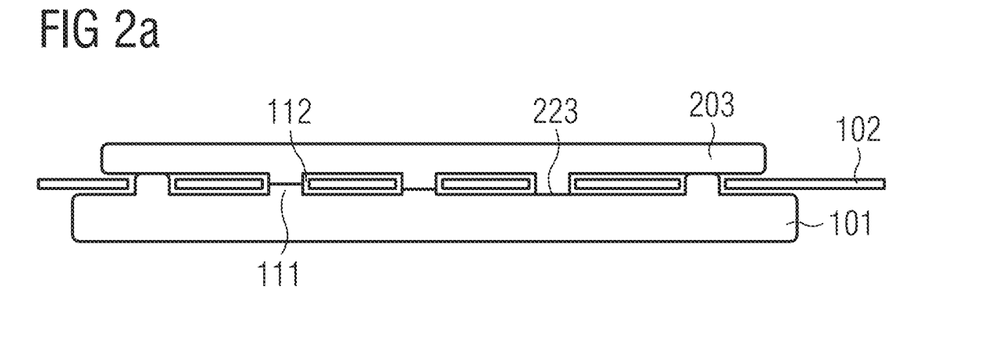
FIG. 2a: schematic representation of a further structure comprising a first material layer, a flexible layer, and a second material layer according to the present invention.

FIG. 2a shows a further schematic representation of a structure according to the present invention, wherein also the second material layer 203 comprises a plurality of protrusions 223 that extend through the apertures 112 of the flexible layer 102. The protrusions 223 may be connected to the protrusions 111 of the first material layer 101, but may also be connected to the first material layer outside the regions of protrusions.

Figure 2B:
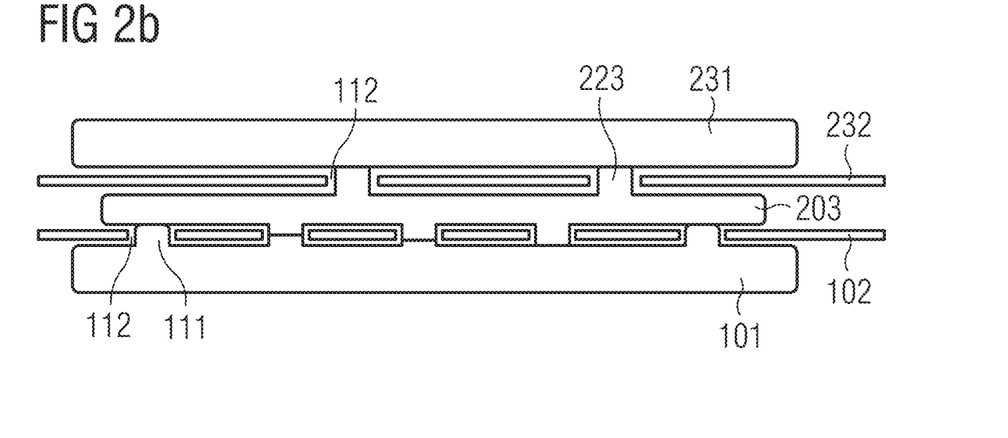
FIG. 2b: schematic representation of a further structure comprising a first material layer, a flexible layer, a second material layer, a second flexible layer and a third material layer, which can be used for the present invention.
Figure 2C:
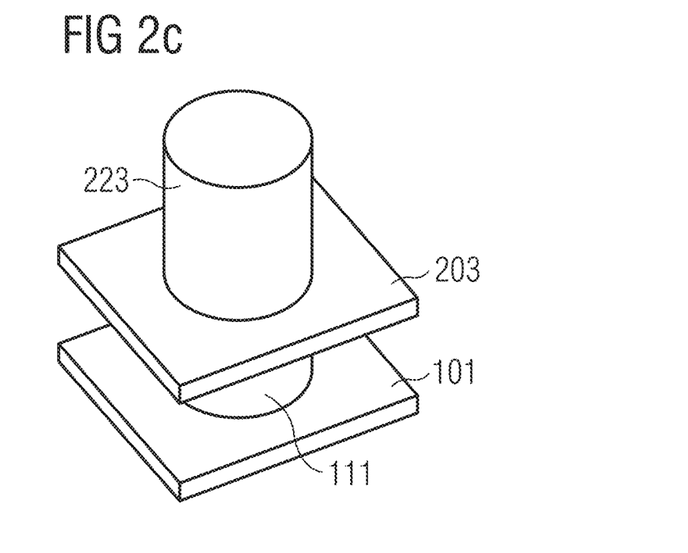
FIG. 2c: schematic representation of a further structure comprising a first material layer with protrusions and a second material layer with protrusions, which can be used for the present invention.

FIG. 2b shows another schematic representation of a structure, wherein the protrusions 223 of the second material layer 203 extend through a second flexible layer 232 with apertures 242 and connects to a third material layer 231. It is conceivable that the protrusions 223 of the second material layer are not positioned on top of the protrusions 111 of the first material layer. Alternatively, as shown in FIG. 2c, the protrusions 111 of the first material layer 101 and the protrusions 223 of the second material layer 203 can be aligned on top of each other.

Figure 3:
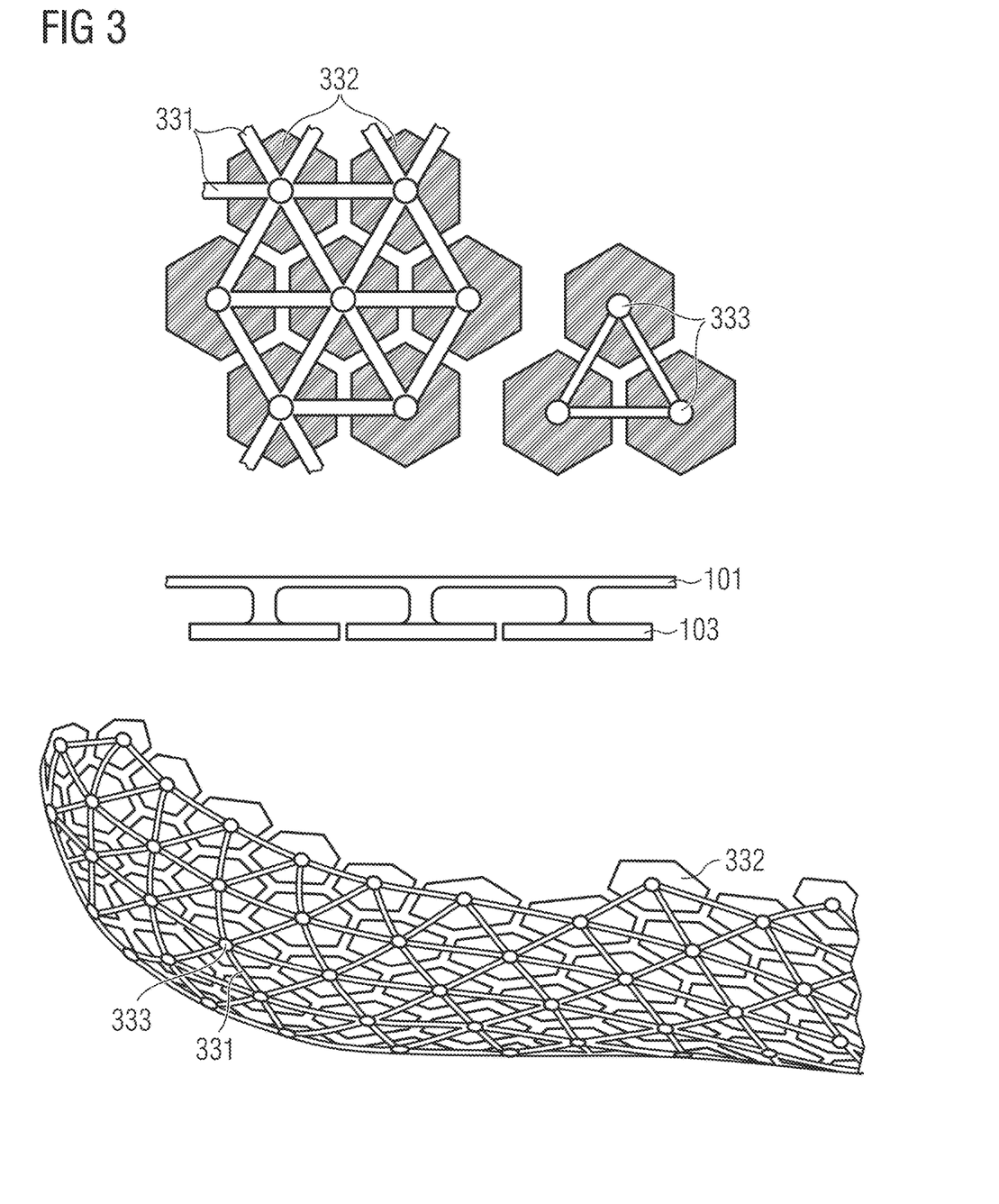
FIG. 3: schematic representation of a structure comprising a first material layer with reinforcing struts and a second material layer with reinforcing areas, which can be used for the present invention.

FIG. 3 shows a schematic representation of the first and the second material layers (101, 103). The flexible layer is positioned between the first and the second material layer (not shown). In this example, the first material layer 101 comprises a network of reinforcing struts 331, wherein the struts are interconnected by a plurality of nodes 333. The nodes interconnect three reinforcing struts. The first and the second material layers comprise a network of reinforcing elements 331 and reinforcing areas 332 that are connected by means of protrusions of the first material layer. The protrusions can be localized at the nodes of the network. In principle, the network of reinforcing struts can be of a regular or irregular structure. For example, longer and shorter struts can be 3D-printed, such that the overall network comprises zones of higher stability (shorter struts) and zones of higher flexibility (longer struts). The density of the protrusions, being localized at the nodes, can vary from about 0.5 to 5 protrusions per $cm^2$. The reinforcing areas 332 can have various shapes, in this case hexagons. However, also different shapes, such as circles or squares, are conceivable (not shown).

Different materials may be employed for the first and second material layers, as well as for the flexible layer. The network of reinforcing struts 331 and the reinforcing areas 332 can be manufactured in a 3D-printing process as a single piece, for example from polylactic acid, TPU or other polymer filaments. Other 3D printed materials for the first and second material layers include acrylonitrile butadiene styrene, nylon, ceramic, gypsum, or metals.

The flexible layer 102 with apertures 112 may be weft-knitted or warp-knitted. The apertures 112 can be arranged in patterns, wherein the apertures comprise different cross-sectional areas, ranging from 10 mm$^2$ to about 70 mm$^2$. In particular, weft-knitted textiles may be provided with a range of functional properties and used in the present invention in an advantageous manner. A weft-knitting technique allows to manufacture textiles with structures with apertures in those regions, where the first material layer shall extend through the textile layer. Further, the yarn may be varied in certain areas of the textile layer to adjust, for example, locally the stiffness of the textile. According to the invention, also more than one textile layer with a plurality of apertures may be positioned between the first and the second material layers. The additional textile layers may be connected to each other by means of sewing, gluing, welding or linking, for example, but in principle, all textile layers that are sandwiched between the first and the second material layers do not need to be connected mechanically to each other. Multiple textile layers between the first material layer and the second material layer can be in particular relevant for increasing the stability and solidness of, for example, a shoe upper.

The structures of the first and the second material layers (101, 103) may be pre-designed using available CAD model software. The pattern of the apertures of the textile layer 102 can be pre-designed in line with the CAD-model of the first and the second material layers. For example, the textile layer can be weft-knitted to comprise a pattern of apertures. The apertures allow the protrusions of the first material layer to extend through to connect to the second material layer.

Figure 4A:
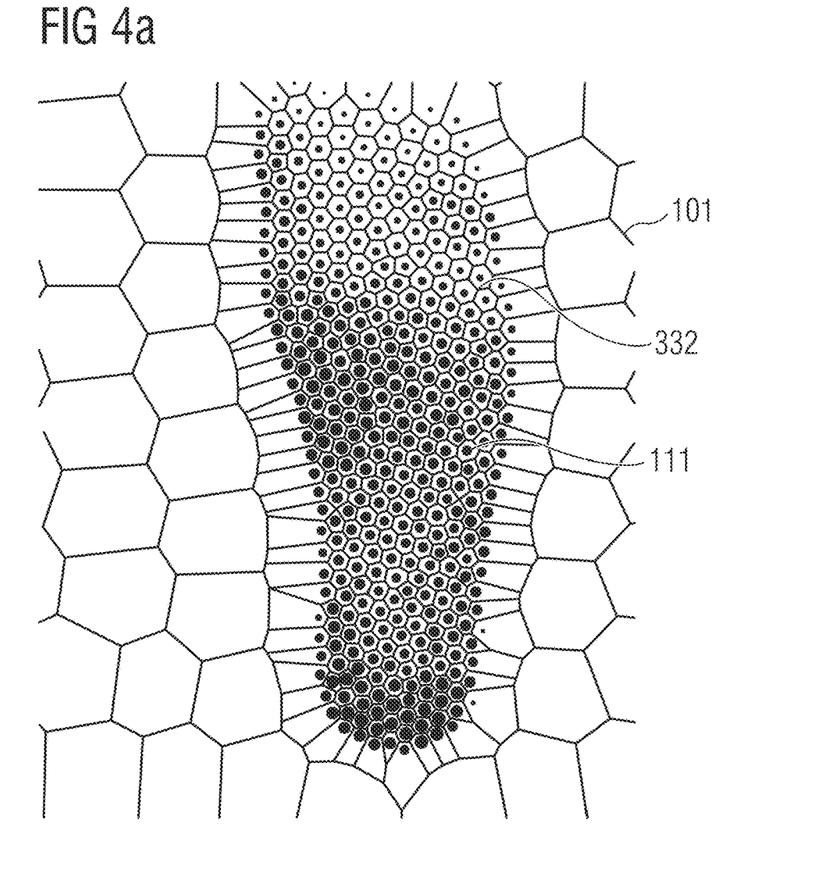
FIG. 4a, b: schematic representations of a shoe according to the present invention.

The structures according to the present invention can be used for the manufacturing of shoes. In this context, FIG. 4a illustrates a shoe insole. The shoe insole comprises a material layer with a pattern of reinforcing areas 332. The reinforcing areas are formed as hexagons of a uniform surface area of about 100 mm$^2$. The reinforcing areas further comprise protrusions 111, shown as black circles within the reinforcing areas. In this example, the protrusions have varying cross-sectional areas ranging from about 4 mm$^2$ to 80 mm$^2$. The protrusions are arranged, such that regions of the foot requiring a high stability, e.g. the medial side and the heel region, are in particular supported by protrusions with larger cross-sectional areas.

Figure 4B:
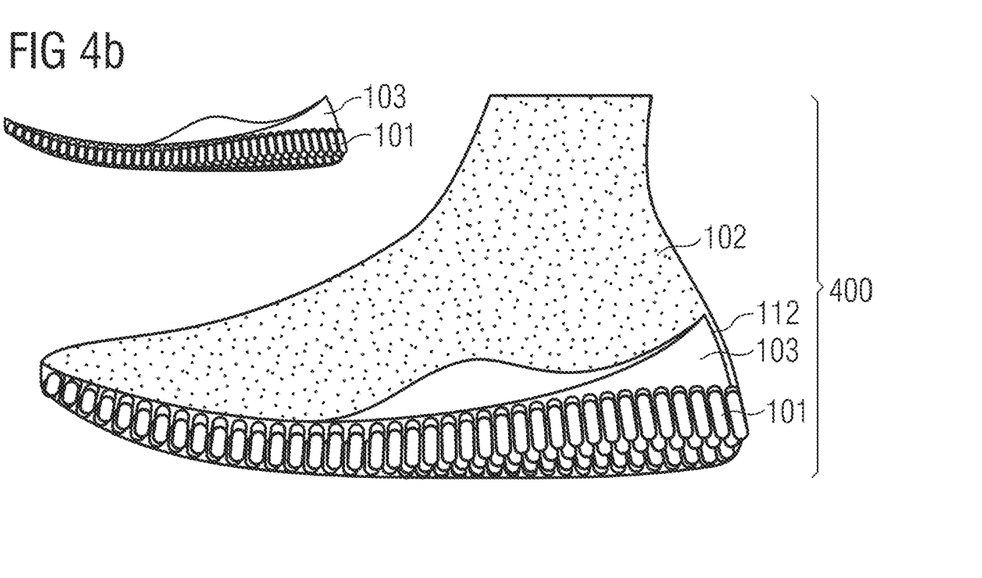

FIG. 4b illustrates schematically a shoe 400 according to the invention. The flexible layer 102 forms at least partially the shoe upper. The second material layer 103 forms the shoe insole, and is connected to the first material layer 101 by means of protrusions (not shown) that extend through apertures of the flexible layer. The first material layer 101 forms the shoe midsole and is three-dimensionally shaped to support the anatomy of the foot. The second material layer extends beyond the first material layer and supports the medial side wing and the heel region. It is conceivable that a further material layer is connected to the second material layer by means of protrusions of the second material layer (not shown). In particular, the further material layer can provide reinforcing elements, such as a heel or a toe cap. In this case, the flexible layer 102 is not only sandwiched between the midsole, formed by the first material layer 101, and the insole, formed by the second material layer 103, but also between the insole and the reinforcing elements formed by a further material layer.

Figure 5:
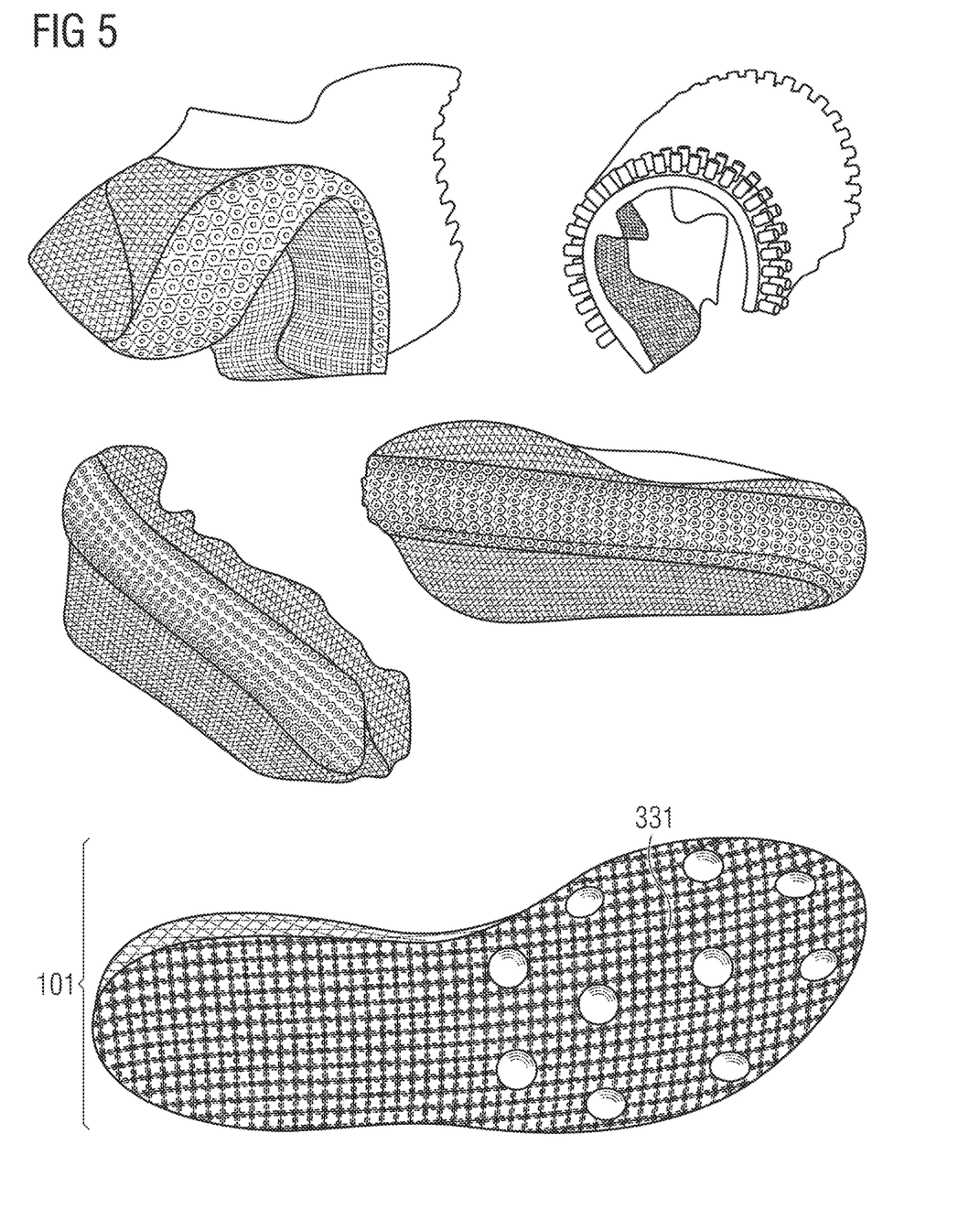
FIG. 5: an embodiment of a shoe sole shown in different perspectives, which can be used for the present invention.

The first and or the second material layer may be formed of highly flexible material, as shown in FIG. 5. In this example, a material layer is 3D-printed from polylactic acid, TPU or other polymer filament, in the form of a shoe sole. As described above with respect to FIG. 3, other potential 3D printed materials include for example acrylonitrile butadiene styrene, nylon, ceramic, gypsum, or metals. The material layer is three-dimensionally shaped and comprises a network of reinforcing struts. Thereby, the material is extremely flexible and light-weight, providing a high comfort for the wearer. During manufacturing of a shoe sole, a flexible layer is added onto the protrusions of the sole to form the shoe upper, and a second material layer is directly printed on top of the protrusions (not shown).

Figure 6A:
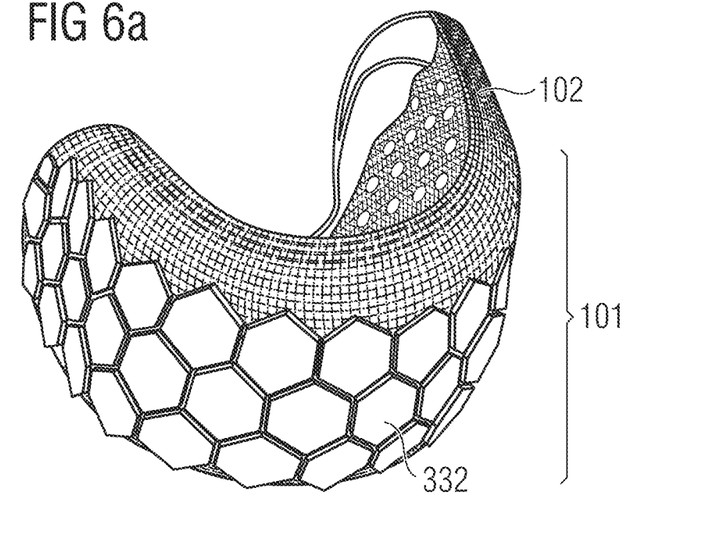
FIGS. 6a-c: embodiments of parts of a shoe, which can be used for the present invention.
Figure 6B:
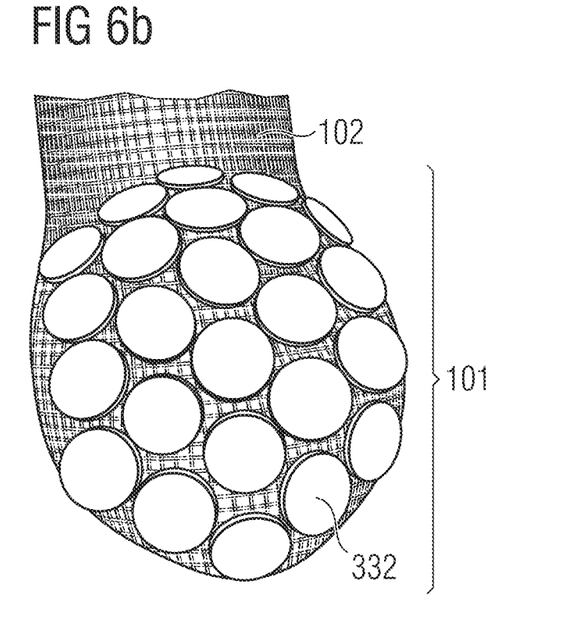
Figure 6C:
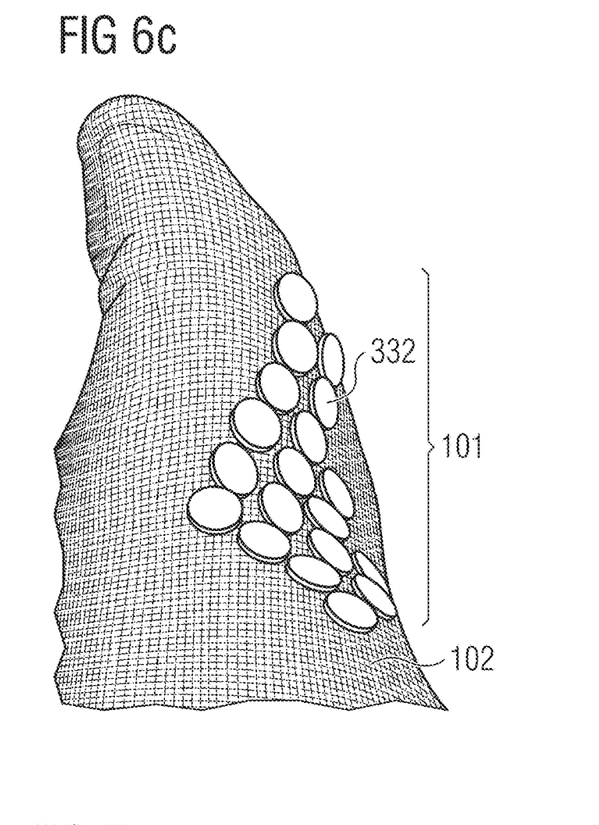

FIG. 6a to FIG. 6c show further embodiments for the manufacture of a shoe, wherein the flexible layer 102 provides at least partially the shoe upper. The apertures of the flexible layer can vary from loosely knitted (FIG. 6 a, b) to fine-gauge knitted fabrics (FIG. 6c). In these embodiments, the first material layer 101 is formed from hexagonal or round reinforcing areas 332 prepared from polylactic acid, which are 3D-printed. The individual reinforcing areas 332 are not connected with neighboring reinforcing areas within the first material layer. The reinforcing areas comprise protrusions that extend through the flexible layer 102 to connect to a second material layer on the opposite side of the flexible layer (not shown). In this embodiment, the second material layer also comprises a pattern of individual reinforcing areas 332 that are not connected with the neighboring areas within the second material layer. Thus, each reinforcing area of the first material layer is connected to a reinforcing area of the second material layer via one protrusion. Alternatively, it is also conceivable to provide the second material layer as a network of interconnected reinforcing struts. The reinforcing areas can be in particular located at sensitive parts of the foot, such as the toe region, as shown in FIG. 6a and FIG. 6b, or at the arch region, as shown in FIG. 6c.

Figure 7:
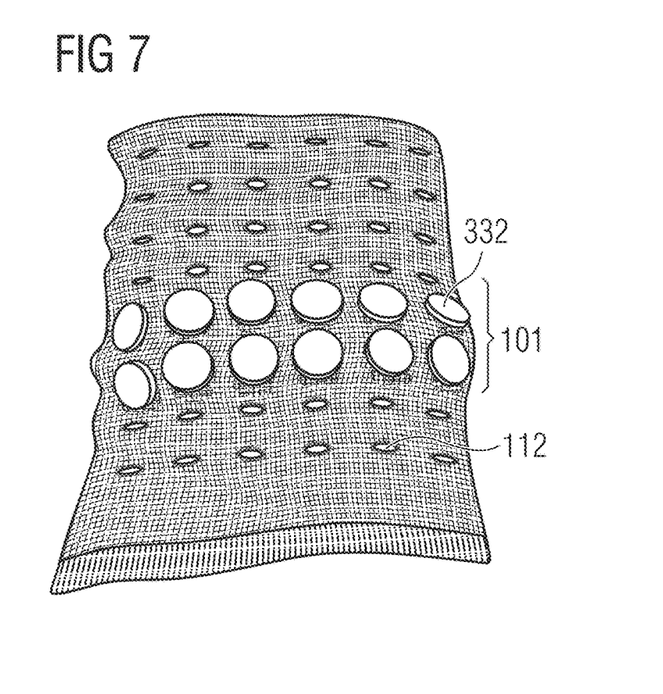
FIG. 7: a further embodiment of a structure, which can be used for the present invention.

Finally, FIG. 7 shows an embodiment for the manufacture of apparel, wherein the flexible layer comprises symmetrically arranged apertures 112 at a density of about 1 aperture per cm$^2$, through which the first material layer 101 is connected to the second material layer via protrusions (not shown). The first material layer is formed from reinforcing areas 332 of a round shape that have a cross-sectional area of about 100 mm$^2$. In this embodiment, the second material layer is also formed from reinforcing areas 332 of round shape, with each reinforcing area not connected to neighboring reinforcing areas of the second material layer, but connected to a reinforcing area 332 of the first material layer via one protrusion (not shown). The protrusions are centrally arranged within each reinforcing area of the first material layer (not shown). The flexible layer comprises elastic yarns to provide sufficient stretchability and, thus, comfort to the wearer. The apparel can be in particular an arm or knee protector.

What is claimed is:

1. A shoe or apparel, comprising:
   a first material layer with a first plurality of protrusions;
   a flexible layer with a plurality of apertures; and
   a second material layer;
   wherein the flexible layer is positioned between the first material layer and the second material layer, wherein each protrusion of the first plurality of protrusions of the first material layer extends through at least one aperture of the plurality of apertures of the flexible layer and is connected to the second material layer, and wherein the flexible layer is configured to move between the first material layer and the second material layer.

2. The shoe or apparel according to claim 1, wherein the flexible layer can freely stretch between the first material layer and the second material layer.

3. The shoe or apparel according to claim 1, wherein the protrusions of the first plurality of protrusions of the first material layer are arranged in densities of protrusions ranging from 0.5 to 5 protrusions per cm2.

4. The shoe or apparel according to claim 1, wherein the first material layer, the second material layer, or both the first material layer and the second material layer have a three-dimensional shape.

5. The shoe or apparel according to claim 1, wherein the first material layer, the second material layer, or both the first material layer and the second material layer comprise at least one thermoplastic material.

6. The shoe or apparel according to claim 1, wherein the first material layer, the second material layer, or both the first material layer and the second material layer comprise thermoplastic rubber (TPR), polyurethane (PU), elastomeric polyurethane (EPU), polylactic acid (PLA), ethylene vinyl acetate (EVA), or a combination thereof.

7. The shoe or apparel according to claim 1, wherein the first material layer, the second material layer, or both the first material layer and the second material layer are integrally provided as a single piece.

8. The shoe or apparel according to claim 1, wherein the first material layer and the second material layer are manufactured in a single additive manufacturing process.

9. The shoe or apparel according to claim 1, wherein the second material layer comprises a second plurality of protrusions.

10. The shoe or apparel according to claim 9, wherein at least one protrusion of the second plurality of protrusions of the second material layer extends through at least one aperture of the plurality of apertures of the flexible layer and is connected to the first material layer.

11. The shoe or apparel according to claim 9, wherein at least one protrusion of the second plurality of protrusions of the second material layer extends through at least one aperture of a plurality of apertures of a second flexible layer and is connected to a third material layer.

12. The shoe or apparel according to claim 1, wherein the first material layer, the second material layer, or both the first material layer and the second material layer comprise a network of reinforcing struts.

13. The shoe or apparel according to claim 1, wherein the first material layer, the second material layer, or both the first material layer and the second material layer comprise reinforcing areas.

14. The shoe or apparel according to claim 13, wherein the reinforcing areas comprise surface areas ranging from 9 mm$^2$ to 225 mm$^2$.

15. A shoe, in particular a sports shoe, according to claim 1, comprising an upper and a sole, wherein the flexible layer forms a portion of the upper.

16. The shoe according to claim 15, wherein the first material layer, the second material layer, or both the first material layer and the second material layer form a shoe midsole, a shoe insole or a shoe outsole.

17. The shoe according to claim 16, wherein the first material layer forms the shoe outsole or the shoe insole, and wherein the second material layer forms the shoe midsole.

18. The shoe according to claim 15, wherein the first material layer, the second material layer, or both the first material layer and the second material layer form at least one reinforcing element of the upper.

19. The shoe or apparel according to claim 1, wherein a gap is defined between a protrusion of the first plurality of protrusions and an aperture of the plurality of apertures through which the protrusion extends such that the flexible layer is movable in a planar direction within a distance determined by the gap.

20. The shoe or apparel according to claim 1, wherein a first protrusion of the first plurality of protrusions has a first cross sectional area, and wherein a second protrusion of the first plurality of protrusions has a second cross sectional area that is greater than the first cross sectional area.

* * * * *